Jan. 19, 1932.　　　O. W. HOSKING　　　1,841,444
SAND TREATING APPARATUS
Filed Nov. 15, 1928　　　5 Sheets-Sheet 5

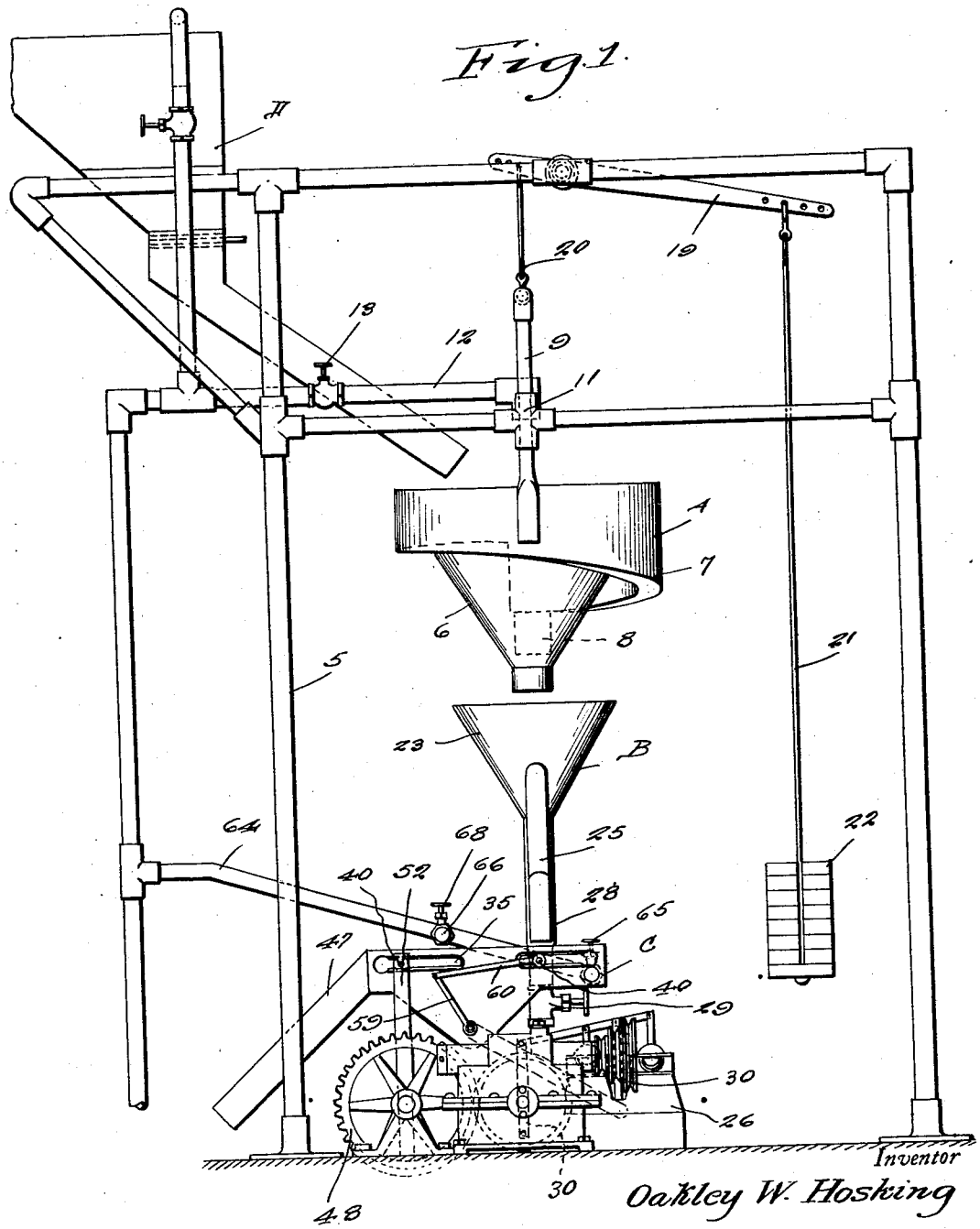

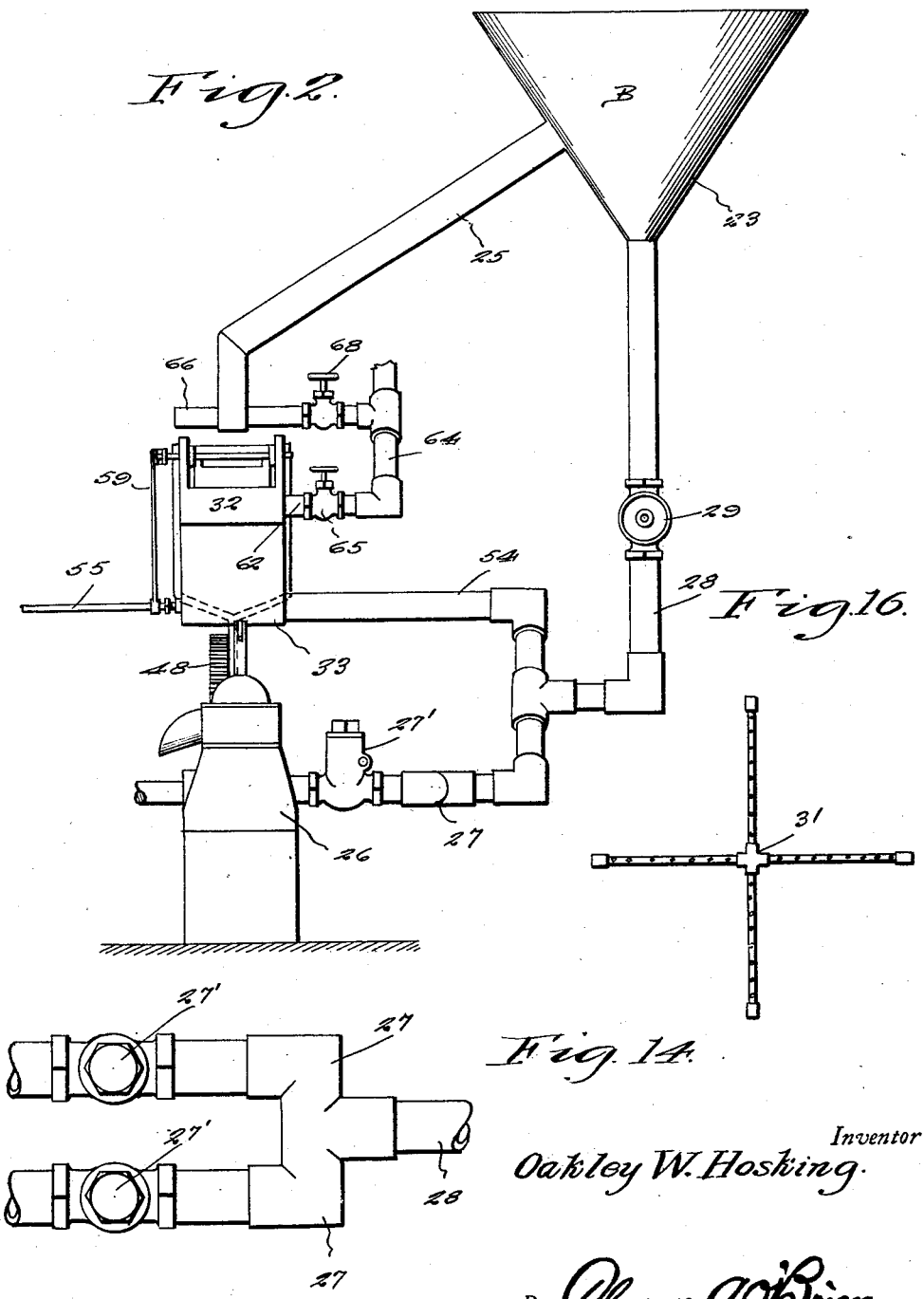

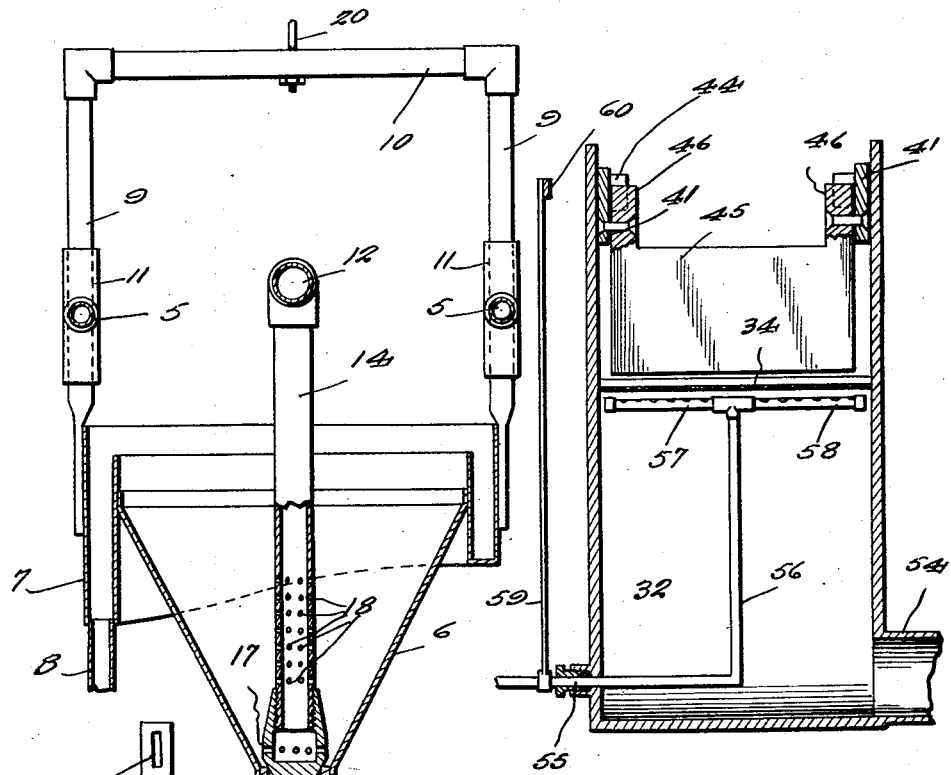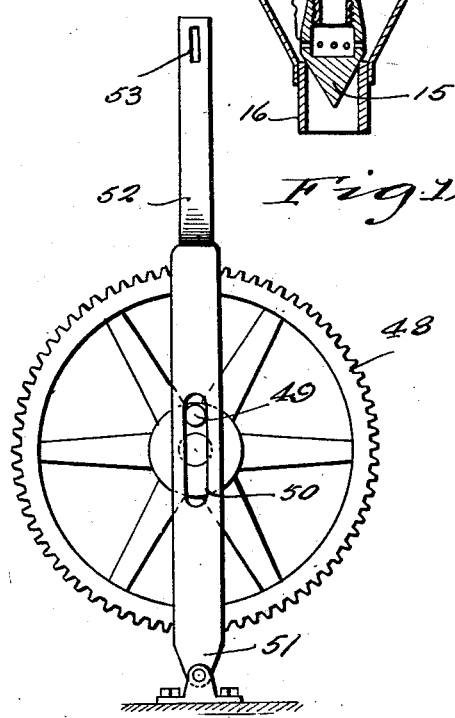

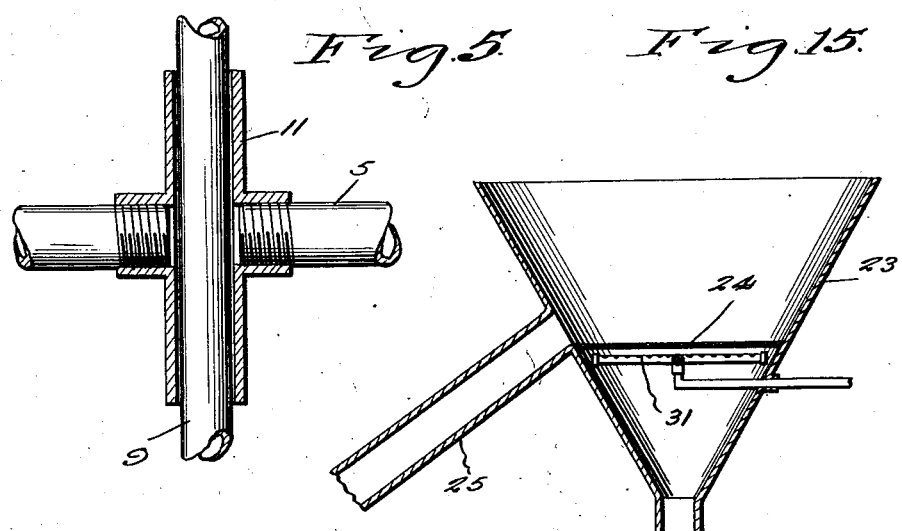
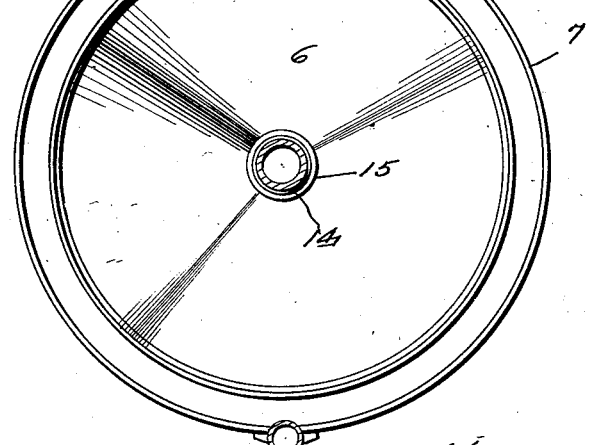
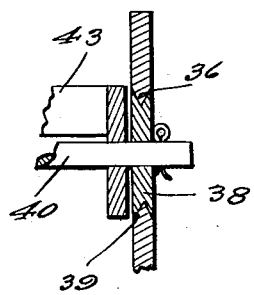
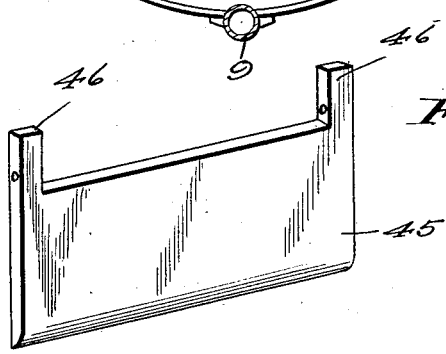

Inventor
Oakley W. Hosking
By Clarence A. O'Brien
Attorney

Patented Jan. 19, 1932

1,841,444

UNITED STATES PATENT OFFICE

OAKLEY W. HOSKING, OF MONROE, NEW YORK

SAND TREATING APPARATUS

Application filed November 15, 1928. Serial No. 319,553.

This invention relates to new and useful improvements in sand treating plants and has particular reference to an apparatus whereby silt, loam, fines or other undesirable substances may be definitely separated from a mass embodying a reasonable percentage of usable sands. Also the apparatus can be readily adjusted to produce a steady flow of any desired grade (as regards size) of sand to meet the most exacting specifications in practice. Furthermore, the apparatus includes a rinsing and dewatering device through which the sand passes following the primary separation and grading stages.

It is my theory that in order to cleanse sand properly, the mass should first be thoroughly broken up and passed through a wash box or boxes where the separation of silt, fines or other undesirable substances takes place. Also, it is my opinion that the agitation of the mass should not cease until the finished product comes to rest at the bottom of the final wash box. Furthermore, it is my opinion that a mechanical agitation of the mass is not necessary as a centrally located water spray produces a better cleansing effect and results in a more complete break-up of the mass thereby producing a better separation of the undesirable substances from the good sand.

All of the undesirable substances found in the general mass of sand, are the solubles and the lighter particles. The general theory is accepted, that the solubles go into solution and the lighter particles are partially suspended, both of which are definitely separated from the main mass by going over the spill-way with the waste wash water. This invention provides for the expansion of the mass following its entry into the wash box and dispenses with undesirable solubles which oftentimes produce objectionable crystal deposits in sand rendering it useless commercially as building or filter material.

It will be readily noted that all of the above has been carefully studied and a proper solution has been accomplished in the development of this invention. The central spray in the separation and grading unit breaks up the mass as it enters the center of the receptacle and ample expansion room is provided by the conical shape which facilitates a constant upward outlet for the lighter particles that have to be removed and a quick definite separation is assured by the fact that the entire 360 degrees of the top of the cone forms the spillway.

The automatically controlled outlet for the treated sand is simple in design and very sensitive, yet positive. The dumping operation is as constant as the feeding; in other words, the discharge from the separation and grading unit is constant (or nearly so) depending upon how steadily it is fed. Any commercial grade (as regards size) of sand desired can be produced by gauging the sand level in this unit, which is accomplished by arranging the weights on the counter balance control.

Objectionable solubles often found in sand, when treated by a washing process are mostly in solution by the time they reach the final wash box and a good portion of this dense moisture follows through with the finished product. While the finished product may be termed reasonably clean and free from silt, etc., it is still heavily laden with the dense moisture containing the objectionable solubles. The development of a rinsing device in this invention definitely dispenses with the objectionable solubles by the method of displacement. This being accomplished by applying a spray of clean water upon the treated sands as they are about to leave the secondary dewatering unit thereby displacing the dense soluble laden moisture gathered through the process of washing with clear clean moisture under pressure.

Drawings

Wherein like reference characters indicate corresponding parts throughout the several views:

Figure 1 is a front elevation of a complete sand treating apparatus constructed in accordance with the present invention.

Figure 2 is an end elevation of the apparatus, the frame structure therefor being removed.

Figure 3 is an enlarged vertical cross section taken of the separating and grading unit.

Figure 4 is a top plan view thereof, the central water spray pipe being illustrated in cross section.

Figure 5 is an enlarged fragmentary section through one of the sliding joints between said unit and the apparatus frame.

Figure 9 is a vertical transverse section through said secondary dewatering and rinsing unit taken substantially upon line 9—9 of Figure 6.

Figure 10 is a perspective of one of the pivotal flights or blades of the conveying unit arranged within said secondary dewaterer and rinser for removing the completely treated sand therefrom.

Figure 11 is a fragmentary section through one of the side walls of said secondary dewatering and rinsing unit illustrating the manner of movably arranging the conveyor unit therein.

Figure 12 is an enlarged side elevation of the driving unit for the conveyor and said secondary dewatering and rinsing unit.

Figure 13 is a similar view of the driving unit between the power mechanism and the suction pumps means for said secondary dewaterer and rinser.

Figure 14 is a fragmentary plan view of the double intake for the dual suction pump apparatus.

Figure 15 is a fragmentary vertical section through the primary dewaterer located directly beneath the separating and grading unit.

Figure 16 is a plan view of an air nozzle located directly beneath the screen floor of the primary dewaterer in order to prevent sealing of the sands upon the screen in said primary dewaterer.

Figure 6:
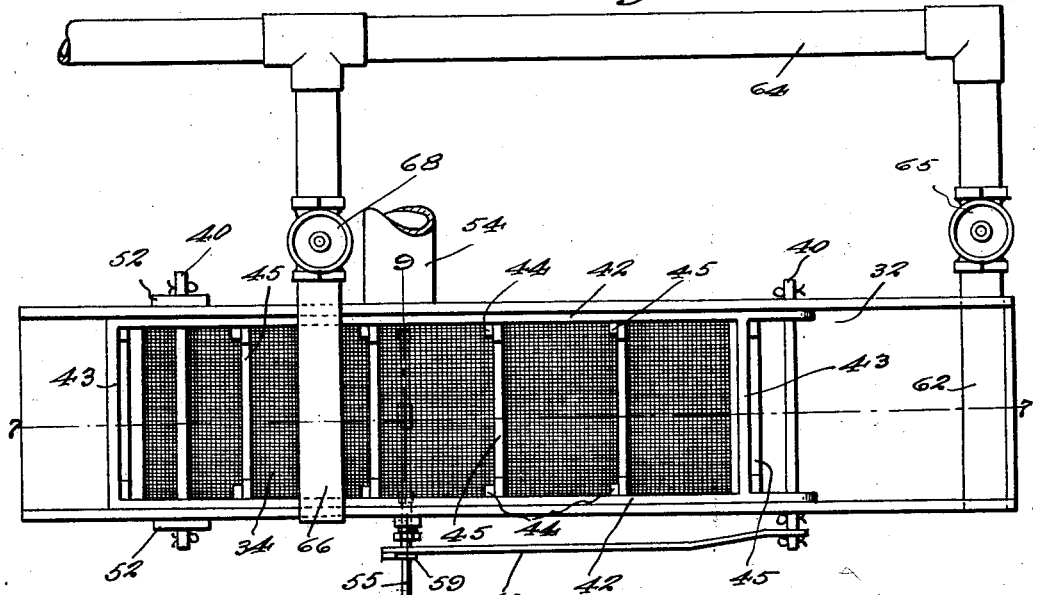
Figure 6 is a top plan view of the secondary dewatering and rinsing unit.

Now, having particular reference to the drawings; 5 designates generally the superstructure or supporting frame for the entire apparatus and it is of course to be understood that I do not desire to be limited to any particular character of superstructure frame, but departures may be made from that shown in the drawings without affecting the spirit and scope of the invention.

The apparatus includes generally, a separating and grading unit A, a primary dewaterer located directly therebeneath designated B, and a combined secondary dewaterer and rinser C. Said separating and grading unit consists of a conical receptacle 6 having constructed at its upper, larger and receiving end a circular spillway 7. The upper edge of the inner wall of the spillway is lower than the similar edge of the outer wall which is clearly illustrated in Figure 3. The bottom wall or floor of this spillway is inclined throughout its entire length terminating at its low point into a waste material discharge 8. This unit is mounted for vertical movement in a true vertical plane, the arrangement illustrated consisting of vertically extending bars 9—9 associated at opposed points with the said spillway 7, said bars interconnected at their upper ends by a cross member 10. These bars 9—9 are freely slidable through collars 11—11 which are rigidly associated with the superstructure 5. (See Figures 1 and 5.) Above the said unit there is arranged a water supply pipe 12 having a suitable control valve 13, this service extends downwardly through the center of the conical receptacle 6 and communicates with water spray pipe 14, the lower end of which is provided with a tapered cut-off valve tip 15 adapted for engagement with the upper inside end of a sleeve 16 located in the lower or discharge end of said receptacle cutting off the flow of the material from the receptacle until the weight of the material therein counteracts means provided for normally maintaining the receptacle outlet closed. This valve tip 15 is provided with fluid orifices 17 as is also the lower section of the water spray pipe 14 which pipe orifices are designated by the reference character 18. Said elevating means for the unit can be of any desired structure, that illustrated consisting of a lever 19 pivoted to the top of the superstructure 5 and being connected at its inner end to the cross member 10 of the said bars 9—9 by suitable links 20. Attached to the outer opposite end of this lever 19 is a rod or cable 21 adapted for receiving at its lower end any desired number of weights 22. Obviously by increasing or diminishing the pull upon the outer end of the lever 19 will regulate the height of the material within the receptacle by reason of the fact that the outlet of the receptacle will not move away from the valve tip 15 until the weight of the sand overcomes said weight on lever 19, while the height of the material in the receptacle controls the extent of the separating and grading process as it is obvious that when the level of the material within the receptacle is low the extent of the separation and grading is low and vice-versa. The sand is received within the receptacle 6 from any desirable means such as illustrated in Figure 1, and designated by the reference character D. The material entering the center of the receptacle is immediately broken up and a continuous agitation of the mass is caused by the water discharging through the orifices in the central spray pipe 14 as well as from the orifices in the valve tip 15, the silt, loam and the rejected finer sands are carried upwardly and outwardly and flow over into the spillway 7, the heavier useful products passing through the receptacle as is obvious.

Arranged directly beneath the receptacle 6 is the conical shaped receptacle 23 of the primary dewaterer B. Within this receptacle 23 and upon which the sand falls is a screen 24 of predetermined mesh, said receptacle 23 being provided with an inclined discharge pipe 25 at a point just above the screen 24. The receptacle 23 beneath the screen 24 has communication with a dual suction pump 26, suction pipes 27—27 extend from said pump and are connected to a pipe 28 that has direct communication with the receptacle 23 which is clearly illustrated in Figure 2. The pipes 27—27 are equipped with suitable check valves 27'—27', while within the line between these check valves and the receptacle 23 is a cut-off valve 29 to control the extraction of the moisture from the sand while passing over the screen 24. The pump is operatively connected with a suitable power take-off unit 30, of any desired type or design. It is obvious that a considerable amount of the moisture from the sand discharging from the separating and grading unit A will be extracted while passing over the screen 24 in the receptacle 23 by action of the superimposed suction in communication with the dual pumping unit 26. Located directly beneath the screen 24 of the primary dewaterer receptacle 23 is a series of air blast pipes 31 having their outlet openings at the top sides and having communication with a suitable source of compressed air which is manually or automatically controlled to break a possible seal of the sands upon the screen 24 thereby maintaining a constant opening for the waters to pass through into the suction pipe 28.

Figure 7:
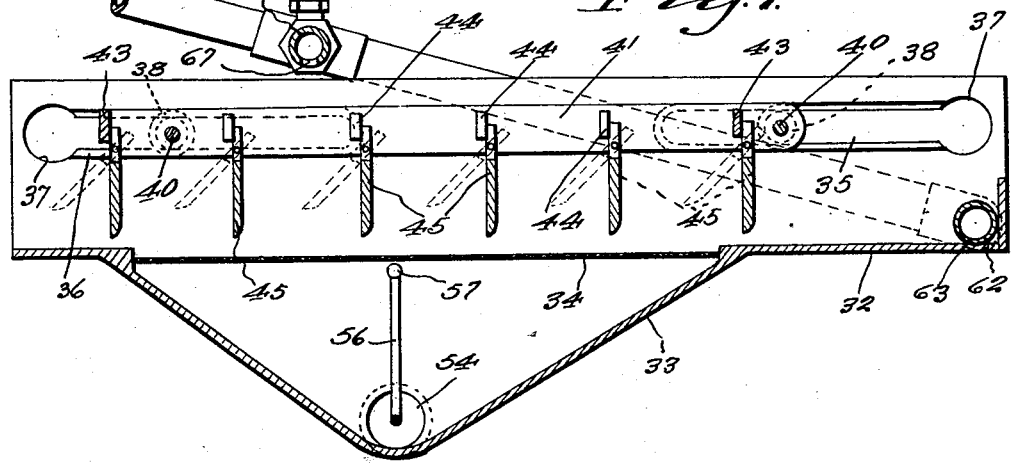
Figure 7 is a detail longitudinal section therethrough taken substantially upon line 7—7 of Figure 6.
Figure 8:
Figure 8 is a fragmentary longitudinal section on an enlarged scale through the rinsing water spray pipe.

The combined secondary dewaterer and rinsing unit C is located beneath and forwardly of the primary dewaterer B, said combined unit consisting of a horizontally arranged sand receiving trough 32, the central bottom of which is formed by a somewhat triangularly shaped water chamber 33, the top wall of the water chamber defined by wire mesh screen 34 and located slightly below the bottom surface of the trough 32 so that a sand filter will build up between the screen and the level of the remaining plate bottom which is rigidly attached to the opposite ends of the side walls of the trough 32. Close to the upper edges of the side walls of the trough 32 are transversely registering and longitudinally extending slots 35, the edges of which are beveled as at 36 in Figure 11, while the outer ends of these slots are enlarged and rounded as at 37 so as to enable rollers 38 to be arranged within the slots, these rollers being formed at their peripheries with V-shaped grooves 39 for receiving the bevel edges of said slots 35 to prevent transverse movement of the rollers within said slots. Extending through central openings of transversely associated rollers at opposite ends of the trough 32 are shafts 40—40 which shafts support an elongated open rectangular frame 41 consisting of parallel side bars 42—42 interconnected at their opposite ends by cross members 43—43. Between these cross members 43—43 and in equally spaced relation, the inner faces of said side bars 42—42 are formed or equipped with stop lugs 44. Loosely pivoted between these side bars 42—42 directly adjacent the lugs 44 and the end members 43—43 are conveyor blades or flights 45 formed at their upper edges and at opposite ends with vertically extending tongues 46 for engagement with said lugs and said cross members to prevent the movement of the blades or flights out of their perpendicular plane when said frame 41 is moving toward the outlet end of the trough 32. Furthermore, the lower edges of these blades or flights terminate in spaced relation with respect to the bottom wall of the trough 32 so as not to interfere with the sand filter that builds up upon the bottom wall of the trough following the initial injection of the treated sand therein from the discharge pipe 25 of the receptacle 23 of said primary dewaterer B, which outlet pipe 25 is located substantially upon the longitudinal center line of the trough 32 at a point slightly forward of the forward stop position of the rear end member 43 of the elongated frame 41. The movement of the frame 41 in a direction toward the outlet end of the trough will cause the blades or flights 45 to engage the sand above the filter upon the screen 34 for scraping the same therefrom, from whence it is carried into a discharge chute 47 at the left end of the trough 32. (See Figure 1.) Obviously, the manner in which the blades or flights are pivoted will allow them to swing to the dotted line position in Figure 7 when the frame is moving toward the opposite end of the trough so as not to carry the sand toward the end of the trough opposed to the discharge end thereof.

Any suitable means may be provided for continuously reciprocating the blade or flight carrying frame 41 during the operation of the machine, but preferably this means consists of a large gear 48 associated with the power take-off unit 30 and having at its inner side an eccentric pin 49 movable through a vertical slot 50 in a pitman 51 pivoted to the machine base at its lower end and having a yoke 52 at its upper end, the side legs of this yoke being longitudinally slotted at their upper ends as at 53, said slots receiving the opposite ends of adjacent roller shaft 40. (See Figures 1 and 6.)

The water chamber 33 of said secondary dewaterer and rinser is in communication with the suction pump 26 through the medium of a suction pipe 54 and obviously all of the remaining free flowing fluids at this point will be extracted while passing over the screen 34 in the trough 32 by action of the superimposed suction in communication with the dual pumping unit 26.

Located beneath the screen 34 of said water chamber there is rotatably mounted through a packed opening in one of the side walls of the chamber 33 a compressed air conductor 55 the inner end of which extends vertically as at 56 and is provided at the upper end thereof with a transverse pipe 57 capped at its opposite ends and provided at its top with air orifices 58. Attached to this pipe outwardly of said chamber 33 is an arm 59 attached at its upper end to the adjacent end of the remote roller shaft 40 of said frame 41 by a pitman 60. Obviously therefore during the reciprocation of the frame within the trough 32 the pipe 57 will be swung in an arc beneath the screen 34. The pipe 55 has communication with any suitable source of air pressure operable either manually or automatically to break a possible seal of the sands upon the screen 34 thereby maintaining a constant opening for the fluids to pass through into the suction pipe 54. Furthermore, the interior of the trough 32 may be cleaned at any time by reason of the location of the transverse water pipe 62 upon the floor of the trough 32 and at the end thereof remote from the discharge end of said trough. Directly above the floor of the trough said pipe 62 is provided with a longitudinal water slot 63 said pipe having communication with any source of water supply through the medium of a pipe 64 having a control valve 65 therein. Also communicating with this water pipe 64 is a transversely extended rinsing spray pipe 66 superimposed upon the trough 32 near the discharge end thereof, that portion of the pipe 66 within the confines of the trough being provided with small water discharge orifices 67, this pipe 66 being also equipped with a control valve 68. This device furnishes a means of projecting a spray of rinsing water upon the sand prior to its leaving the range of the suction pumps thereby displacing with clear clean water the heavily soluble laden moisture that is in the sand up to this point.

It will thus be seen that I have provided a highly efficient yet relatively simple sand treating apparatus that is well adapted for all of the purposes heretofore designated, and even though I have herein shown and described the invention as consisting of certain detail structural features it is nevertheless to be understood that departures may be had therefrom without affecting the spirit and scope of the appended claims.

Having thus described the invention, what I claim as new and desire to secure by Letters Patent is:—

1. In a sand treating apparatus, having a rigid frame and a sand receptacle having an outlet at its bottom and vertically movable with respect to the frame, a stationary water pipe rigidly fixed to the frame and located centrally within the receptacle and having a tapered head upon its lower end for closing the receptacle outlet when the receptacle is elevated, said water pipe having outlet openings in the receptacle, an overflow spillway at the upper end of the receptacle and selective pressure mechanism for maintaining the receptacle outlet closed until the material within the receptacle overbalances said mechanism.

2. In a sand treating apparatus, a vertically movable pan receptacle having a discharge outlet, an overflow spillway at the upper end of said receptacle, a stationary water pipe extending into said receptacle axially with respect to said discharge outlet, a valve head on the lower end of said water pipe for seating engagement with the walls of said discharge outlet, the lower end of said water pipe and said valve head having water discharge orifices therein, and weight means acting upon said receptacle to normally hold the same with the valve heat in seating engagement with the walls of said discharge outlet.

In testimony whereof I affix my signature.

OAKLEY W. HOSKING.